United States Patent
Gauthier et al.

(10) Patent No.: US 10,828,632 B2
(45) Date of Patent: *Nov. 10, 2020

(54) METHOD FOR COMPOSITIONAL SORTING OF CATALYST OR ADSORBENT IN MIXTURES OF CATALYSTS AND/OR ADSORBENTS

(71) Applicants: Eurecat S.A., La Voulte sur Rhone (FR); IFP Energies Nouvelles, Rueil-Malmaison (FR)

(72) Inventors: Thierry Gauthier, Brignais (FR); Charles Philippe Lienemann, Villemoirieu (FR); Wilfried Weiss, Valencin (FR); Pierre Dufresne, Aouste sur Sye (FR); Pauline Galliou, Saint Laurent du Pape (FR)

(73) Assignees: Eurecat S.A., La Voulte Sur Rhone (FR); IFP Energies Nouvelles, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/579,398

(22) PCT Filed: Jun. 3, 2016

(86) PCT No.: PCT/EP2016/062725
§ 371 (c)(1),
(2) Date: Dec. 4, 2017

(87) PCT Pub. No.: WO2016/193479
PCT Pub. Date: Dec. 8, 2016

(65) Prior Publication Data
US 2018/0161767 A1      Jun. 14, 2018

(30) Foreign Application Priority Data
Jun. 5, 2015 (FR) ..................................... 15 55165

(51) Int. Cl.
*B01J 38/72* (2006.01)
*B07C 5/342* (2006.01)
(Continued)

(52) U.S. Cl.
CPC ............. *B01J 38/72* (2013.01); *B01J 23/882* (2013.01); *B01J 23/883* (2013.01); *B01J 23/888* (2013.01);
(Continued)

(58) Field of Classification Search
CPC ....... B07C 5/342; B07C 5/3427; B07C 5/366; G01N 21/85; G01N 2021/8592;
(Continued)

(56) References Cited

U.S. PATENT DOCUMENTS

| 4,347,121 A | 8/1982 | Mayer |
| 8,063,261 B2 | 11/2011 | Rokicki |

(Continued)

FOREIGN PATENT DOCUMENTS

WO    2015082424 A1    6/2015

OTHER PUBLICATIONS

International Search Report PCT/EP2016/062725 dated Aug. 8, 2016.
(Continued)

*Primary Examiner* — Charles A Fox
*Assistant Examiner* — Kalyanavenkateshware Kumar
(74) *Attorney, Agent, or Firm* — Millen, White, Zelano and Branigan, P.C.

(57) ABSTRACT

A method for separation of at least one catalyst or adsorbent from a homogeneous mixture of catalysts or adsorbents, used in a method for treatment of gas or hydrocarbon feedstock, in which the grains of catalysts or adsorbents are separated according to a sorting threshold corresponding to (Continued)

a content of the constituent element that is sought and defined by the user.

13 Claims, 2 Drawing Sheets

(51) Int. Cl.

| | |
|---|---|
| *B01J 27/19* | (2006.01) |
| *B01J 29/40* | (2006.01) |
| *G01N 21/85* | (2006.01) |
| *G01N 21/71* | (2006.01) |
| *B01J 23/883* | (2006.01) |
| *B01J 35/00* | (2006.01) |
| *B01J 23/888* | (2006.01) |
| *B01J 23/882* | (2006.01) |
| *B07C 5/36* | (2006.01) |
| *G01J 3/443* | (2006.01) |
| *B01J 21/20* | (2006.01) |
| *B01J 23/94* | (2006.01) |
| *B01J 38/00* | (2006.01) |
| *B01J 27/185* | (2006.01) |
| *B01J 29/90* | (2006.01) |
| *B01J 27/28* | (2006.01) |

(52) U.S. Cl.
CPC ............... *B01J 27/19* (2013.01); *B01J 29/40* (2013.01); *B01J 35/0006* (2013.01); *B07C 5/342* (2013.01); *B07C 5/3427* (2013.01); *B07C 5/366* (2013.01); *G01J 3/443* (2013.01); *G01N 21/718* (2013.01); *G01N 21/85* (2013.01); *B01J 21/20* (2013.01); *B01J 23/94* (2013.01); *B01J 27/1853* (2013.01); *B01J 27/285* (2013.01); *B01J 29/90* (2013.01); *B01J 35/0033* (2013.01); *B01J 38/00* (2013.01); *G01N 2021/8592* (2013.01)

(58) Field of Classification Search
CPC ..... G01N 21/718; B01J 38/72; B01J 27/1853; B01J 27/19; B01J 27/285; B01J 23/882; B01J 23/883; B01J 23/888; B01J 23/94; B01J 29/40; B01J 29/90; B01J 35/0033; B01J 38/00; B01J 21/20; G01J 3/443
See application file for complete search history.

(56) References Cited

U.S. PATENT DOCUMENTS

| | | | |
|---|---|---|---|
| 9,855,588 B2 | 1/2018 | Gauthier | |
| 2009/0000992 A1 | 1/2009 | Dufresne | |
| 2014/0260801 A1* | 9/2014 | Wellwood | ............ B07C 5/3427 75/392 |
| 2016/0318073 A1* | 11/2016 | Gauthier | ................ B07C 5/342 |

OTHER PUBLICATIONS

Asimellis G et al: "Platinum group metals bulk analysis in automobile catalyst recycling material by laser-induced breakdown spectroscopy", Spectrochimica Acta. Part B: Atomic Spectroscopy, New York, NY, US, US, vol. 63, No. 11, Nov. 1, 2008 (Nov. 1, 2008), pp. 1338-1343, XP025685358, ISSN: 0584-8547, [retrieved on Oct. 9, 2008].
S. Davesne: "Encore 15 milliards à distribuer", L'Usine Nouvelle, No. 3389, Sep. 11, 2014 (Sep. 11, 2014), XP055262242.
Yamina Tayeb: "Le projet Trisur, lauréat du concours mondial d'innovation", La Tribune, Sep. 2, 2014 (Sep. 2, 2014), XP055262244, Retrieved from the Internet [retrieved on Apr. 1, 2016].

* cited by examiner

METHOD FOR COMPOSITIONAL SORTING OF CATALYST OR ADSORBENT IN MIXTURES OF CATALYSTS AND/OR ADSORBENTS

The invention relates to a method for separation of at least one catalyst from a homogeneous mixture of catalysts, with this separation being based on a detection of compositional difference owing to LIBS technology, and at least one of these catalysts is then regenerated to be reused for a new catalytic cycle.

PRIOR ART

There is a large variety of types of catalysts and adsorbents. A significant volume relates to the applications in the field of petroleum refining, petrochemistry, chemistry, and the treatment of natural gas.

The catalysts contain constituent elements (metals) that impart to the catalyst the catalytic properties that are required for treating certain gaseous streams or petroleum fractions, such as Ni, Co, Mo, W, in particular for the hydrotreatment and hydroconversion catalysts, such as Pd, Pt, Ni, Cu, Cr, in particular in methods for hydrogenation, dehydrogenation, isomerization, reforming, hydroconversion.

One of the refining methods using catalysts is the hydrotreatment or hydroconversion (hydroprocessing) that consists in treating petroleum feedstocks to either convert them into lighter products, or to refine them, i.e., to purify them.

The hydrotreatment/hydrocracking catalysts consist of a sulfide-type active phase of metals Ni, Co, Mo or W with an alumina or silica-alumina substrate. These catalysts are used in reactors under hydrogen pressure, which contain several tens to several hundreds of tons of catalysts. A reactor always contains different types of catalysts. Even if they are in general from the same family, namely containing the metals Ni, Co, Mo or W, they can have a different shape or a different composition.

The service life of a catalytic hydrotreatment reactor is from 1 to several years. At the end of a cycle, the performance of the catalysts has decreased so much that the unit should be shut down and the catalysts unloaded from the reactors. Then, they can be treated as waste or then undergo an oxidizing regeneration that allows them to regain performance levels close to those of new products.

Today, only about 20% of these hydrotreatment/hydrocracking catalysts are regenerated after review to then be reused. The remaining 80% become waste treated for recovery of reusable metals. This regeneration rate is low, and it brings with it additional costs for the user network and strategic metal losses, with the recycling of the metals always being carried out with yields of much lower than 100%.

The reasons for non-regenerability of the hydrotreatment catalysts are four in number.

The first is a sintering either of the substrate or of the active phase, and the catalyst is considered to be irrecoverable.

The second is contamination: the catalysts are polluted by elements conveyed by the petroleum feedstock. The same is true for vanadium, which is contained in the heavy fractions of crude.

The third reason is that they have lost a portion of their properties, in particular properties of mechanical strength. Thus, they become too fragile or have an inappropriate shape to be reused.

These three reasons for non-regenerability are standard and do not relate to the hydrotreatments but are applied to many other types of catalyst.

A fourth reason relates more specifically to this invention. It also projects beyond the field of refinery hydrotreatments.

The non-regenerability can stem from the fact that several types of these catalysts are loaded into the same reactor, in order to optimize the overall performance of the reactor, with the catalysts having varied activities or selectivities for different reactions.

However, during the operations for unloading reactors at the end of the cycle, the catalysts are inevitably mixed with one another. Actually, even when the catalysts are loaded separately according to layers (beds or stacks) that are quite distinct, the emptying has the effect of mixing these different layers, because experience shows that the emptying process follows an hourglass-type law rather than a piston-flow law, meaning that all of the layers of possibly different products become mixed.

In this case, the catalysts are no longer reusable, with the users requiring reloading catalysts of a specific type and not mixtures. Such mixtures are considered to be waste and are redirected to recycling industries for recovery of metals.

For example, the hydrotreatment reactors are often loaded with multiple types of catalysts; thus, different commercial names, different compositions that allow different catalytic actions, for example, CoMo and NiMo catalysts (mixture of cobalt/nickel and molybdenum and alumina), or NiMo/alumina substrate catalysts, and NiW (nickel/tungsten)/alumina substrate and zeolite catalysts. If they have different grain sizes, they can be separated by mechanical sorting. If they have the same grain size, and if they have been loaded into the same bed of the same reactor, they will be unloaded in a mixture. They are then not reusable in a mixture as such after regeneration and therefore become waste because no known technology makes it possible to separate them.

Certain dehydrogenation catalysts, containing chromium at a level of 10 to 25% of $Cr_2O_3$, can be used not in the pure state but in a mixture with an inert product, catalytically non-active, typically an alumina, for reasons of thermal balance. When the catalyst is spent, it is unloaded with its diluent. It is therefore appropriate to separate the catalyst that contains metals from the aluminum diluent to recycle the catalyst in an optimal way.

This is the problem raised by this fourth reason that the invention proposes to solve.

DESCRIPTION OF THE INVENTION

The invention relates more specifically to a method for separation of at least one catalyst or adsorbent from a homogeneous mixture of catalysts and/or adsorbents, with said catalysts or adsorbents having been used in a method for treatment of gas or hydrocarbon feedstock, method in which the catalyst grains or adsorbents are separated according to a sorting threshold corresponding to a content of said element and defined by the user, method in which:

The catalyst grains of said mixture run past an LIBS detection system that detects the wavelength that is characteristic of said constituent element, The analyzing device associated with LIBS processes the signal sent by the detection system by comparing it to a set-point value that indicates the sorting threshold, The analyzing device sends a signal to order the evacuation of grains according to the content thereof in said element, and at least 2 batches are obtained: at least one batch of catalysts heavily loaded with said element in relation to the sorting threshold and at least one batch of catalysts lightly loaded with said element in relation to the sorting threshold, And at least one of the batches of catalysts that are lightly loaded with said element is recycled into said gas or hydrocarbon batch treatment method after possible regeneration.

The invention can also be applied to adsorbents or mixtures of catalysts and adsorbents.

Constituent element is defined as an element of the composition of the catalyst or the adsorbent in the fresh (or new) state, i.e., before use in the gas or hydrocarbon feedstock treatment methods.

The invention is implemented preferably when the catalyst that is to be separated contains as a constituent element a non-metal element, preferably selected from the group that is formed by phosphorus, boron, lithium, sodium, potassium, calcium, chlorine, silicon, or the constituent element is metal and is preferably aluminum, titanium, or chromium, copper, zinc.

The invention relates more specifically to a method and a device making it possible to sort catalysts or adsorbents that contain phosphorus from other catalysts or adsorbents without phosphorus, or that have significantly lower phosphorus content.

The invention relates more specifically to a method that makes it possible to sort a catalyst or adsorbent that contains boron from other catalysts or adsorbents without boron, or that have a significantly lower boron content.

The invention relates more specifically to a method that makes it possible to sort a catalyst or adsorbent that contains a silica-alumina—amorphous or crystallized (zeolite)—from other catalysts or adsorbents without silica-alumina. In this case, the compositional detection can be carried out on the element Si contained in the fraction that contains the silica-alumina.

The invention more specifically relates to a method that makes it possible to sort a chromium-containing catalyst from a mixture with other solids, catalytic or not, without chromium. These other solids can be a diluent that consists essentially of alumina, an arrangement that is found on the guard bed that is at the top of the reactor and that comprises one or more catalytic beds downstream from said guard bed.

The invention more specifically relates to a method and a device making it possible to sort a catalyst that contains a so-called mass or non-supported hydrotreatment catalyst, essentially containing metals in the oxide or sulfide state (more than 50% by weight), other supported catalysts with a smaller content of metals (less than 30%). In the case where the substrate of the supported catalyst is alumina, it will be possible to perform the compositional sorting on the element Al.

The catalysts are used in methods for treatments of gas of different compositions or treatments of hydrocarbon feedstocks. Among the gas treatments, it is possible to cite the Claus method, and tail gas treatments. For the hydrocarbon feedstocks, it is possible to mention the catalysts that are used in the methods for hydrotreatment, hydrocracking, and hydroconversion of distillates, as well as applications of hydrogenation, dehydrogenation, isomerization, reforming.

The substrate is generally based on (or advantageously consists of) alumina, silica-alumina, titanium oxide; in the hydrocracking and hydroconversion catalysts, zeolite (crystallized silica-alumina) can be present.

According to the invention, the dwell time of a grain in front of the LIBS detection system is less than 50 ms (milliseconds), and preferably less than 10 ms.

The method according to the invention makes it possible to detect and to sort a number of grains that is greater than 20 grains per second, preferably greater than 50 grains per second, and even greater than 100 or 200 grains/s and that can reach up to 1,000 grains/s or more.

In a preferred way, the grains flow in such a way that their spacing is between zero and their characteristic largest dimension. The measurement frequency is between $1/t$ and $1/2t$, with t being the dwell time of the grain in front of the LIBS detection system.

Advantageously, the spacing between the grains is at maximum equal to their characteristic largest dimension. This makes it possible to maximize the quantity of material that is treated for a given flow rate of the grains.

Advantageously, the detection system is positioned in such a way that the depth of the field of analysis above the surface of the transport means is between ⅓ and 3 times the characteristic smallest dimension of the grain.

The object of the invention is to propose, for catalysts or adsorbents, which are objects of homogeneous and well-defined shape (cylindrical extrudates, trilobes or multilobes, balls), a sorting method using the very fast LIBS on-line detection means.

The Catalysts or Adsorbents:

The catalysts are objects that are well defined in shape, size and composition. Their mixture can be separated according to the invention when this mixture is homogeneous, and quite obviously when there is a difference in the level of constituent element(s) (presence or absence, content) and when this difference can be detected by LIBS.

The length of the extrudates has a certain distribution around a mean value, this being due to a certain variability of length during the production of catalysts or adsorbents, but also to phenomena of attrition and breakage of extrudates that undergo a certain reduction in length as a result. Hereinafter, the mean length of the extrudates will be referred to as the characteristic largest dimension.

The diameter of a ball or a cylindrical extrudate, or else the circumscribed diameter that is tangent to the peaks of the lobes for a trilobe or a multilobe, is defined as the characteristic smallest dimension of a particle. In a general manner, the term diameter will be used in the entire text as being the characteristic smallest dimension regardless of the particle type.

The diameter of the particles (or grains) is in general well defined, and its dispersion is in general small compared to its mean value.

The Homogeneous Mixture

According to the invention, the catalysts to be sorted come in the form of a homogeneous mixture.

"Homogeneous mixture" is defined as a mixture in which the catalysts have a homogeneous size and/or a homogeneous shape. "Homogeneous size" means that the diameters are very close.

Figure 3:
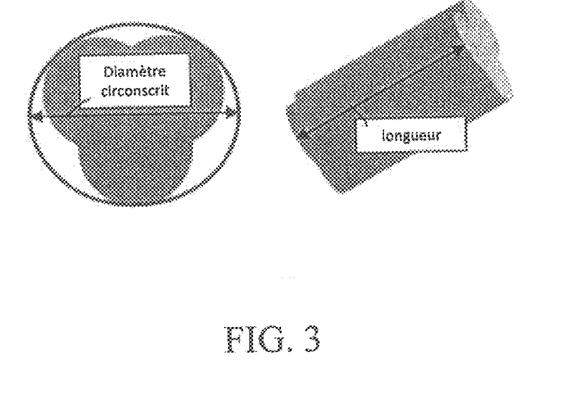
FIG. 3 shows representative catalyst grains.

In general, the catalyst has the shape of balls, or cylindrical extrudates, trilobes or quadrilobes or multilobes with a diameter that is often between 0.5 and 3 mm (often close to 0.9-1.5 mm) and with a length that is equal to 2 to 5 times the diameter of the extrudates. It can be shaped in the form of balls of 0.5 to 10 mm, preferably between 0.5 and 5 mm in diameter, or pellets. The catalysts can also be used in the form of dispersed powders, whose diameter is in general less than 200 microns, but this shaping does not relate to the object of the invention. FIG. 3 shows grain shapes.

It should be noted that these shapes sometimes have defects associated with the production method. For example, extrudates are sometimes slightly curved over the length. These defects are acceptable in the implementation of the method according to the invention.

This homogeneous mixture could be obtained at the end of the preliminary separation step (pre-sorting) based on the physical properties.

This pre-sorting can be performed on catalysts having a different diameter.

This pre-sorting can also be carried out on a mixture that contains grains of similar diameter, but for which it will be desired to eliminate the particles that are too short, which are not reusable, and which it is suitable to eliminate before the compositional sorting. This pre-sorting can be performed by, for example, sieving or another technique that is known to one skilled in the art for separating solids by their size, or any other sorting method (sorting by density . . . ).

This pre-sorting is advantageous, for example, for separating the elements that are loaded at the top of the reactor, so-called elements of the guard layer, or of the guard bed. These elements are often mixed during an unloading with the catalysts that are located in the lower layers. These elements can be balls, rings, extrudates, pellets, which may or may not contain catalytic elements. They should be separated before the upgradable catalysts or adsorbents are subjected to the compositional sorting system with LIBS detection.

This pre-sorting is also advantageous in the case of catalysts of different shapes (for example, cylindrical or multilobed) having different diameters, for example a mixture of 1.5 mm and 3 mm. The conventional mechanical separation techniques, the sieving, for example, can be implemented for recovering each product.

It can also happen that two catalysts or adsorbents of the same shape and dimension but of different composition are loaded into the same reactor. In this case, the invention makes it possible to solve the problem posed by the selective recovery of one or more of the components of the mixture.

The Components of the Catalyst

The substrate of the catalysts or adsorbents is generally based on (or preferably consists of) alumina or silica-alumina or titanium oxide, with the optional presence of zeolite in particular for the catalysts for hydrocracking, for hydroconversion of distillates, or for hydrotreatment.

The catalysts contain constituent elements (metals) that impart to the catalyst the catalytic properties that are required for treating certain gaseous streams or petroleum fractions, such as Ni, Co, Mo, W, in particular for the catalysts for hydrotreatment and hydroconversion, such as Pd, Pt, Ni, Cu, Cr, in particular in methods for hydrogenation, dehydrogenation, isomerization, reforming, hydroconversion.

The active phase of the catalysts for hydrotreatment and hydrocracking contains sulfides of cobalt, nickel, molybdenum or tungsten, which are supported, generally on alumina. The new catalyst is initially prepared with oxides of these metals, which are then sulfurized. In general, the CoMo, NiMo, NiCoMo or NiW combinations are found based on the reaction objectives, with the initial composition of nickel oxide or cobalt oxide being in general between 2 and 10% by weight on the catalyst, and the composition of molybdenum or tungsten oxides being close to 15 to 30% by weight. The case of non-supported catalysts, so-called mass catalysts, which then essentially contain mixtures of metal salts in their composition, for example essentially in the activated state of the sulfides of Ni, Mo, W, also exists.

The catalyst may or may not contain phosphorus or boron, which are dopant-type elements used to improve the performance of the products. The hydrotreatment reactor can contain various catalysts of the same form and of different composition of P and B and that cannot be reused as a mixture after unloading from the reactor. The invention then makes it possible to sort catalysts that contain phosphorus from other catalysts without phosphorus, or that have a significantly smaller content of phosphorus, or a catalyst that contains boron from other catalysts without boron, or that have a significantly smaller content of boron.

The catalyst may or may not contain silicon; this is the case of catalysts that have a substrate containing silica-alumina. The former can be of the amorphous or crystallized type, in which case this is in general a zeolite. This amorphous or crystallized silica-alumina is added, for example, when an acid group is desired to promote the cracking of hydrocarbon molecules.

The hydroconversion catalysts contain the element Si, with contents of between 1 and 45%, preferably between 2 and 40%, and in a more preferred manner between 3 and 30%. As a reminder, the hydrotreatment catalysts contain Si contents that are often less than 2, and even 1%.

Certain hydrocracking catalysts contain, for example, an NiMo or NiW phase combined with a mixture of zeolite (or amorphous silica-alumina) and alumina. They are in general loaded in a reactor located downstream from another reactor that contains one or more NiMo/alumina catalysts. Sometimes, however, they are loaded into the same reactor in the lower layers of this reactor. They are often loaded into beds separated from these reactors, but in some cases, they can be in the same bed. Upon unloading, for different types of reasons, there can be a mixing there between these two catalyst types.

Other specific hydrocracking applications fall within the category of dewaxing or hydrodewaxing or catalytic deparaffination. The object of the application is to eliminate selectively the linear paraffins that deteriorate the cold strength properties of the gas-oil, or the characteristics of the lubricants. One example is shown in the U.S. Pat. No. 4,347,121 of the Chevron Company, which describes the concatenation of a dewaxing catalyst with a hydrotreatment catalyst, called a hydrofinishing catalyst. The dewaxing catalyst consists of ZSM5-type zeolite and alumina, whereas the finishing catalyst contains Pd and a silica-alumina.

The invention makes it possible to separate the mixtures of these types of catalysts owing to their different composition.

Another mixing case is illustrated in the U.S. Pat. No. 8,063,261, which mentions the use of eta-alumina mixed with a catalyst that contains chromium in the application for dehydrogenation of a C3 or C4 hydrocarbon feedstock for making propylene or butenes. These dehydrogenation catalysts can contain chromium at a level of 10 to 25% of Cr2O3. They can be used in a method that is widely used commercially, referred to as the Catofin method.

For reasons of thermal balance of this method, the catalyst is not used in pure form, but in a mixture with an inert product that is not catalytically active, typically an alumina, which is used as a diluent, for example at a level of 50% volume.

When the catalyst is spent, it is unloaded with its diluent.

It is therefore appropriate to separate the catalyst that contains metals from the aluminum diluent to recycle the catalyst in an optimal way.

Detection by the LIBS Technique

The LIBS is an elementary analysis technique, increasingly used for the direct compositional analysis of solids and liquids. The increasing interest in this technique stems from its numerous advantages including, in this case, a possible in-situ analysis without a particular preparation of samples, a fast analysis, simplicity of use, and specific focusing.

The principle relies on the focusing of a laser pulse on the surface of the sample. This focusing of laser pulses of several nanoseconds, and even femtoseconds, and energy on the order of several tens of millijoules to the point to be analyzed on the material causes the formation of a microplasma. This microplasma feeds on the composition of the surface of the sample, which generates the vaporization and the ionization of the material, and then cools over time.

The size of the analysis point is usually on the order of several microns, and even ten microns. The atoms and the ions of the material present in the microplasma emit by deenergizing photons whose wavelength is characteristic of the chemical element. A spectrometer in the UV/visible range collects, optionally using an optical fiber, and reflects the light emitted by the plasma. The emission lines, generated by the analyzed sample, make it possible to identify the elements that are present in the sample (qualitative analysis) and therefore to know the chemical radicals that composed the sample. Their intensity can also be measured and compared to the one measured for a range of samples of known concentration, so as to measure the elementary composition of the sample (quantitative analysis).

In the case of this invention, a quantitative analysis makes it possible to measure the constituent element content on the catalyst or adsorbent that is to be separated, for example the phosphorus content on a hydrotreatment catalyst.

The response speed of the LIBS is a decisive advantage for the productivity of the sorting with objects of small size such as the catalysts.

The grains of catalyst or adsorbent are subjected to a laser radiation. In return, in an analyzing device, the associated emission is analyzed by spectroscopy with a wavelength that is selected to make possible the detection of the constituent element on the catalyst and preferably to measure the intensity of the peak(s) relative to this element.

To do this, the analyzing device associated with LIBS processes the signal sent by the detection system by comparing it to a set-point value that indicates the presence of the element, and preferably also that indicates the sorting threshold.

The sorting threshold can correspond to 0% by weight, and therefore the presence or absence of the desired constituent element is detected and the sorting is carried out in this presence or absence; 0% corresponds to the detection limit of the LIBS for the element being considered.

The sorting threshold can correspond to a content that is different from 0%, selected by the user according to the desired element and the constraints/objectives of the user. The threshold of the element is selected in such a way as to make possible the separation of the element from the mixture.

The wavelengths that are associated with the contaminant are known to one skilled in the art, as well as the possible interferences with other elements.

NA is fairly emissive, and measurements of content in the catalyst grains can be considered up to contents as low as 0.1%, which makes it possible to sort the catalysts based on a sorting threshold value (sorting threshold) that is selected by the user in the interval between 0.5 and 2% by weight of Na.

For example, for phosphorus, numerous atomic emission lines located between $\lambda=178$ and 254 nm are used for their high intensity and their absence of interference with the constituent elements of the catalyst. Alternatively, the lines with a wavelength of 214.920 or 203.240 nm are used by themselves or in combination with any other spectrum line that constitutes the sample. The sorting can be performed on catalysts containing a threshold value of between 1 and 2% by weight of P.

In the case of boron, which can be a constituent element of the hydrotreatment catalyst, the wavelengths for the detection can be 249.772 and 249.677 nm. The sorting can be performed on catalysts that contain a threshold value of between 0.5 and 2% by weight of B.

In the case of chromium, the sorting threshold value selected by the user in the interval can be between 3 and 6% by weight of Cr.

In the case of silicon, to meet a certain number of requirements for separation of mixtures, the detection threshold can be set at 1 to 3% by weight.

In the case of aluminum, it may happen that the two catalysts contain aluminum, but in a significantly different concentration, for example 40% of Al for a typical hydrotreatment catalyst, and 10% for a zeolitic catalyst or alumina serving only as a shaping link. In this case, the intensity of the signal serves as a discriminating criterion, and the threshold in this example would be set at 20 or 30% by weight. The Al line is at 308.852 nm.

It is necessary to emphasize that the thresholds indicated above are given by way of indication, and it is, of course, possible to have higher values based on sorting constraints desired by the operator.

So as to improve the detection sensitivity, it is possible to make an analysis with several wavelengths, by using, for example, multiple spectrometers coupled to the same light beam and operating in parallel.

The detection system is preferably adjusted in such a way that the depth of field of the analysis above the surface of the transport means is between ⅓ and 3 times the characteristic smallest dimension of the catalyst grain (the diameter of the extrudate in the case of an essentially cylindrical particle, the diameter of the grain in the case of a spherical particle) to make possible an ultra-fast detection of the composition of the grains.

In practice, the analyzing device makes it possible to restore the composition in the desired element with a response time t that is less than 50 ms, preferably less than 10 ms.

The dwell time of a grain in front of the detection system is less than 50 ms, and preferably less than 10 ms, and can range up to less than 1 ms. The number of grains detected is at least 100 grains/s for a detection time of less than 10 ms. It can reach 1,000 grains/s for an analysis time of less than 10 ms.

In a preferred form of the invention, the catalyst grains are spaced, preferably uniformly, by a distance preferably corresponding to the characteristic largest dimension of the catalyst grains, or the mean length of catalyst grains.

The measurement/detection is repeated at intervals.

When the grains are spaced by their mean length, the measurement frequency is equal to 1 t, with t being the dwell time of the grain in front of the detection system. When the grains flow in a contiguous way (the grains are contiguous; their spacing is equal to zero), the frequency is equal to l/t.

In a more general way, the grains, preferably cylindrical extrudates or multilobes, flow in such a way that their spacing is between zero and their length, and the measurement frequency is between 1/t and 1/2t, with t being the dwell time of the grain in front of the LIBS detection system.

The spacing between the grains is monitored by the means that are adjusted based on the detection time of the LIBS detection system. The spacing advantageously can be equal to or less than the mean length of the grains.

For example, these are the means for monitoring the supply (flow rate) of the catalyst grains to the transport means (rolling belt, vibrating conveyor, etc.) and the speed of said means.

In a general way, the conditions of the method are adjusted so that a number of grains that is greater than 20 grains per second and that can range up to 1,000 grains per second and per LIBS detector are treated, and so that the response time of the LIBS detection system is less than 50 ms, preferably less than 10 ms.

In an optional manner, the presence of grains can be detected using another optical device, for example a camera, in such a way that the triggering of the laser of the LIBS system is synchronized with the passage of the grain under the laser beam.

In a preferred embodiment of the invention, each catalyst grain is exposed to the detection system.

In a preferred embodiment of the invention, it is then possible to treat at least 20 grains per second with the same measuring device, for example 20-100 grains/s, preferably more than 100 grains per second, and up to 1,000 grains per second or more.

It is also possible to have multiple detection systems in parallel for operating at high speeds. Thus, the use of 5 detection systems operating in parallel with 200 grains/s will make it possible to reach a flow rate of 1,000 grains/s.

The Determination of the Constituent Element Content

The LIBS system measures the intensity of the peak(s) relative to the contaminant. The user selects a sorting threshold value included in the values indicated above, or greater, according to the sorting requirements thereof.

The spectrometric analysis with the wavelength(s) being considered make(s) it possible to work back to the concentration by mass of the constituent element based on a preliminary calibration.

Depending on the calibration that the operator performs, the set-point value (corresponding to the presence of the contaminant or the sorting threshold) is entered into the LIBS system. This is perhaps a content or any other value connected in a significant manner to the content (this can be the intensity of the peak); all of these techniques are well known to one skilled in the art.

After comparison between the set-point value and the measured value, the system acts to evacuate the grain to the corresponding storage.

It is necessary to emphasize that the presence of a specific element can be correlated with the content of another element. This constitutes an advantage if one of the two elements is more readily detectable with LIBS, because of one or more lines being more emissive, or else because of the interference of another element that disrupts the signal of one contaminant but not the other. This can also be a deliberate choice linked to the use of a spectrophotometer whose spectral band comprises the lines of one element and not the other.

The Separation of Grains

When the LIBS detection system detects the constituent element in one or more grains and preferably also determines the state of the grain in relation to the sorting threshold, it sends a signal to the means for evacuating this grain to be separated in such a way as to separate said grain from said mixture.

The detection system is connected to a system for controlling the evacuation means of the grains containing the desired characteristic element. These means are located in the area of the transport means (conveyor belt . . . ), and most often they are located at the end downstream from (leaving) the transport means.

These means are actuated with a temporal offset depending on their distance with the detection system. An example of an evacuation means that makes it possible to direct the grains in different directions is the use of compressed air. The compressed air jet or the absence of a compressed air jet makes it possible to direct the grain toward the different sorting classes, for example the grains that contain more than X % of a desired element are evacuated upward whereas the grains that contain less than X % of this element are evacuated downward.

For example, if the grain of catalyst or adsorbent contains the desired element with a content that is greater than the sorting threshold set by the operator, then the means are actuated and make possible a deviation of the flow of the grain toward a receptacle A. If, in contrast, the catalyst or the adsorbent contains the contaminant with a content that is less than or equal to the sorting threshold set by the operator, then the means are not actuated and the catalyst flows normally to another receptacle B.

In the case where it is desired to sort the catalysts or adsorbents based on multiple contents of different elements, multiple LIBS detection systems are advantageously used, each having a wavelength adapted to the characteristic element to be separated. The evacuation means are adapted in terms of function.

The many sorting options will not be presented in detail here; there may be more than one sorting in the presence of several LIBS detectors. One skilled in the art will adapt the method according to the invention depending on his needs.

Figure 1:
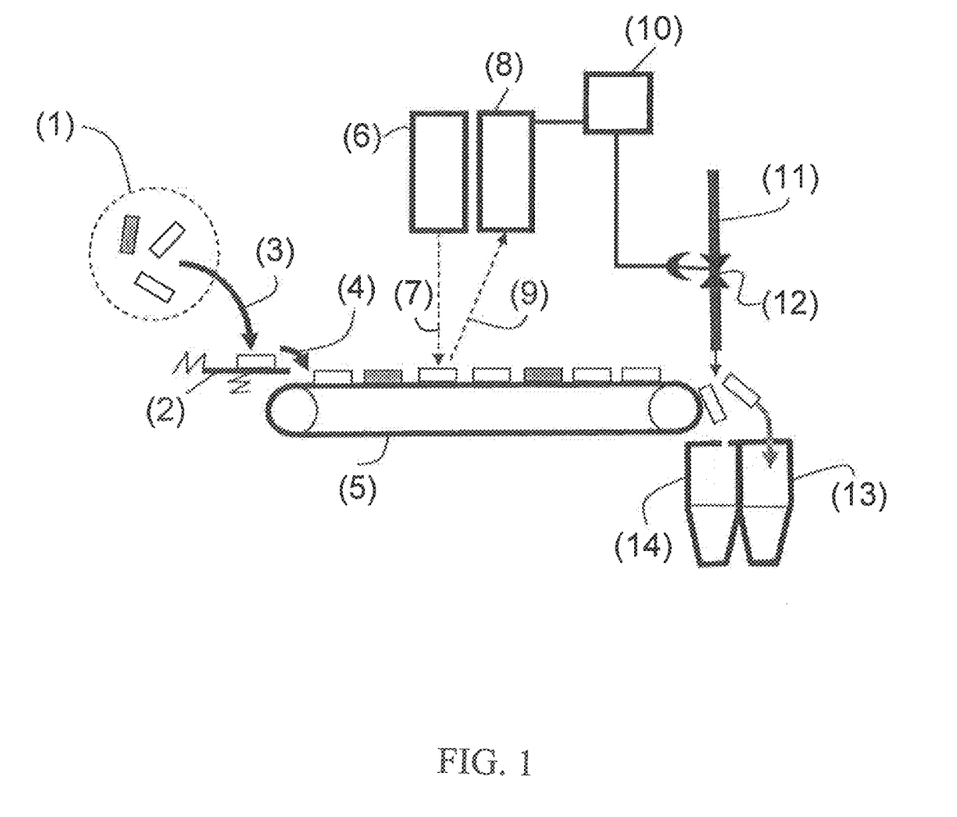
FIG. 1 shows a preferred but non-limiting embodiment in an illustrative manner.
Figure 2:
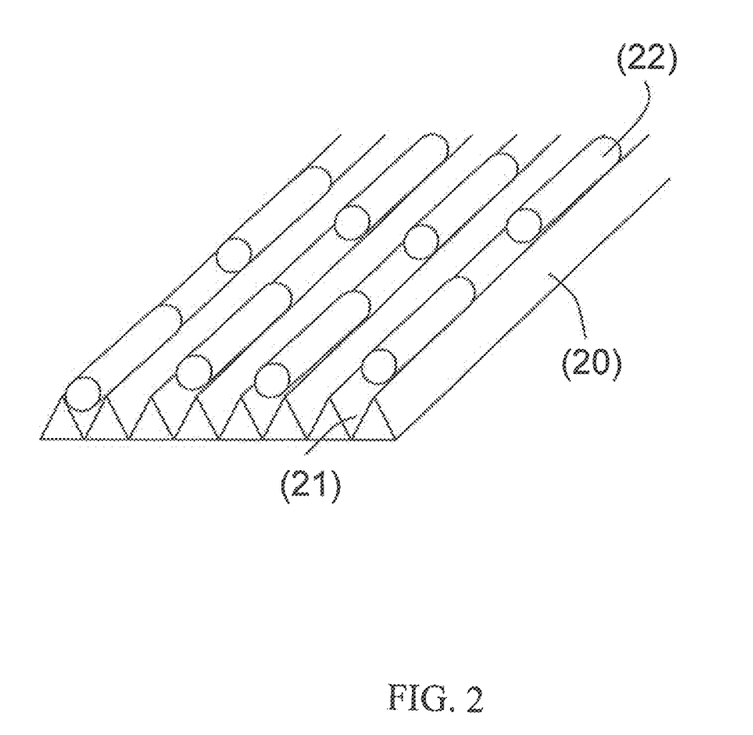
FIG. 2 shows a belt in accordance with the invention.

The method according to the invention can advantageously be implemented with the device described below using the figures. FIG. 1 depicts a preferred embodiment by way of illustration. FIG. 2 depicts a crenellated belt. FIG. 3 shows grain shapes.

This is a device for separating at least one catalyst or adsorbent from a homogeneous mixture of catalysts and/or adsorbents, with said catalysts or adsorbents containing at least one constituent element and having been used in a method for treatment of gas or hydrocarbon feedstock, with the device for separation and sorting making it possible to separate the catalysts or adsorbents according to a sorting threshold corresponding to a content of the constituent element that is desired and defined by the operator, with the device comprising:

A chain for transporting the mixture of catalysts equipped with a transport means, means for monitoring the flow rate of grains on said means, and means for monitoring its speed, with said means being adjusted in such a way that the dwell time of a grain in front of the LIBS detection means is less than 50 ms, and preferably less than 10 ms, and that the number of sorted grains is at least 20 grains/s, preferably at least 100 grains/s, and in an even more preferred way at least 200 grains/s, An LIBS detection system comprising at least one laser past which the grains run, with the detection time being less than 50 ms, and preferably less than 10 ms, and the wavelength being that of the desired constituent element, said system detecting the grain that is loaded with said desired element and measuring the intensity of the peak associated with said wavelength, At least one analyzing device (8) and at least one control means (10), with said analyzing device processing the signal sent by the detector by comparing it to a set-point value that indicates the sorting threshold, At least one means for evacuation of the grains to be separated, with said means being actuated from said control means according to the content of said desired constituent element.

Conventional means for conveying (vibrating tube, vibrating elevator, etc.) and for storing grains to be sorted and then sorted grains can be used at different locations of the sorting method.

Advantageously, the transport means is a rolling belt (or conveyor belt). This can also be a die equipped with an endless screw that has a hollowed-out shaft and is equipped with at least one opening suitable for detection and at least one opening suitable for separation of catalyst grains. This transport means can also be a vibrating belt or tube.

Preferably, the transport means is a conveyor belt that is preferably crenellated, with the gaps being between 0.5 and 3 deep, preferably 0.7 and 1.3 times the characteristic smallest dimension of the grains, corresponding to the diameter in the case of a sphere or an extrudate.

In a preferred way, the adjustment of said means of the transport chain is carried out in such a way that the grains flow with a spacing of between zero and their characteristic largest dimension; the measurement frequency is between 1/t and 1/2t, with t being the dwell time of the grain in front of the LIBS detection system.

The grains are preferably cylindrical extrudates, trilobes, or multilobes.

When the grains are spaced by their mean length, the measurement frequency is equal to 1/2t, with t being the dwell time of the grain in front of the detection system. When the grains flow in a contiguous way (the grains are contiguous; their spacing is equal to zero), the frequency is equal to 1/t.

The device of the invention is particularly well suited to implement the method of the invention. Also, the characteristics described above for the method apply to the device.

Advantageously, the detection system is positioned in such a way that the depth of the analysis field above the surface of the transport means is between ⅓ and 3 times the characteristic smallest dimension of the grain.

Advantageously, the dwell time of a grain in front of the LIBS detection system is less than 50 ms, and preferably less than 10 ms, with the analyses being repeated at intervals at most equal to the dwell time of the grain of the characteristic smallest dimension.

Detailed Description of the Method and Separation Device:

The catalyst grains initially stored in barrels, containers, silos or in bags are then generally transferred into a buffer tank, for example a hopper, with this tank feeding a transport chain that advantageously comprises an unrolling belt such as a conveyor belt or a vibrating tube or channel, and which comprises means for monitoring the flow rate of grains on the rolling belt.

The grains that are transported run past the LIBS analysis system making it possible to determine whether the grains have a lower/equal or greater content (or lower versus greater/equal) of the desired element in relation to one or more sorting thresholds defined by the operator. It may have one or more thresholds for each element according to the needs of the operator.

The unsorted mixture of catalyst grains (1) is brought on a means (2) that makes it possible to monitor the flow rate of grains on the rolling belt (5). The intake means of the mixture (3) can be manual (unloading of a bag, for example) or automatic (by controlled unloading of a silo, for example).

The invention is described with a rolling belt as a transport means, but the description is entirely transposable with another transport means, such as, for example, a vibrating channel.

The means that make it possible to monitor the flow rate are means that are well-known to one skilled in the art, such as, for example, inclined vibrating plates, making possible the uniform spreading of the catalyst grain and the adjustment of the flow rate of the catalyst on the plate toward the rolling belt. One skilled in the art can thus adjust the distance between two grains on the transport chain and consequently adjust the detection frequencies or else, conversely, it is possible to adjust the distance based on the detection frequencies.

By way of example, in FIG. 1, we showed at (2) a vibrating plate in two orthogonal directions. With this type of equipment, it is possible to adjust the vibration frequencies for modulating the flow rate of solid (4) toward the rolling belt (5), to adjust the distribution between the grains over the passage section, and thus to monitor the spacing between the grains depending on the travel speed of the belt.

Preferably, in an optimal manner, the device will be adjusted so that the distance between the grains is at maximum equal to the mean length of the grains.

Leaving the flow rate monitoring means (2), the catalyst grains fall on the rolling belt, which can be a simple flat conveyor belt, or a crenellated belt, as shown in FIG. 2.

The crenellated belt of FIG. 2 has a manifest advantage—when in particular extrudates are sorted—in that it makes it possible, in an advantageous manner, to orient the grains in the direction of flow. The flow of the grains is thus more uniform and spaced, which promotes the detection and the separation, and improves the productivity of the installation. In a general way, regardless of the grain shape, the crenellated belt keeps the grain from moving under the action of the vibrations of the belt and/or pulses of the laser.

In the case of a crenellated belt (20), a form of gap (21) that has the shape of an equilateral triangle as shown in FIG. 2 is advantageous; the depth of the gaps on the belt is then ideally between 0.7 times and 1.3 times the characteristic largest dimension of the grains, the diameter of the catalyst grains in the case of balls, the mean length in the case of cylindrical extrudates or trilobes or multilobes.

The grains (22) are positioned on the belt (20). The travel speed of the belt is adjusted so as to optimize the production capacity, on the one hand, and the capacity of the system to detect the desired contaminant in the catalyst grains.

An attempt will preferably be made to ensure that the dwell time of a grain is less than 50 ms, and is preferably less than 10 ms. More generally, the dwell time is the smallest possible, consistent with the response time of the detection system.

Under these conditions, for example, for a cylindrical extrudate with a length that is equal to 5 mm, the speed is preferably between 0.1 and 5 m/s.

The detection system comprises at least one laser (6), at least one spectrometer (or analyzing device) (8) and at least one means (10) for controlling the opening or not of at least one evacuation means.

A laser (6) emits radiation focused on the surface of the sample (7). Following the pulse on the order of the femtosecond to the nanosecond between the laser and the sample, a plasma fed by the composition of the sample is generated and in several milliseconds sends wavelengths suitable to the composition of the sample (9).

The emissions of the sample (9) are analyzed by a spectrometer (8) with specific wavelengths of the contaminant having to be detected. In an optional way, at least one optical fiber is used between the plasma and the spectrophotometer. It is possible to work with several wavelengths simultaneously by positioning on the light beam several spectrometers in parallel that work simultaneously with different wavelengths.

For example, to measure the element content in the hydrocracking or hydrotreatment catalysts, the wavelength(s) of high intensity will be used.

Based on the requirements, it is possible to analyze all of the grains running past the detection system (6-7-8-9) on the rolling belt (5), overall or individually, by using several laser systems (6) in parallel in such a way as to cover the width of the belt and by adapting or decoupling also the laser and the spectrometer (8) analyzing the emissions (9).

It is also possible to choose to operate statistically, by analyzing only a fraction of the flow, or to consider a movement over the width of the lasers (6) and the spectrometer(s) (8).

The analyzing device (the spectrometer) (8) is connected to control means (10) that make it possible to convert the results of the analysis in action to act on said evacuation means (here, the valve 12).

These means consist of, for example, a computer that makes it possible to initiate the opening of a valve (12).

Thus, for example when the analyzing device (8) detects that the grain has a larger content than the set-point value (for example, the sorting threshold), it sends a signal with the control means (10) that actuates the opening of the valve (12).

The former is located on a duct of inert fluid (air, for example) under a pressure that is if possible greater than 5 bar (preferably air) to promote the creation of a jet of gas (air) that is sufficient to evacuate the grain.

The valve (12) opens during a determined period and then closes again automatically. The opening of the valve makes it possible to generate a jet at the lower end of the duct (11). It acts with the duct as a gas (air) ejection nozzle. Advantageously, the duct (11) is positioned at the end of the conveyor belt at a distance of at most 10 cm from the end of the belt (based on the travel speed of the belt, the lower the unrolling speed of the belt, the closer the duct (11) approaches the end of the belt), at a level above the belt (5) preferably encompassed between 2 and 10 times the characteristic largest dimension of the catalyst grain (its length in the case of an extrudate).

It is possible to position one or more ducts (11) in parallel depending on the width of the transport belt and the shape of the end of the duct.

In the case of a spherical duct end fitting, the diameter of the end fitting of the duct is preferably less than or equal to the mean length of the grains.

If the belt makes possible the simultaneous transition in the width of N particles simultaneously, it is possible to position up to N tubes (11) in parallel, each having their valve, the valves being controlled simultaneously or separately by the control means (10) based on the number of analyzing devices used in parallel.

It is also possible to work with a single duct (11) but providing that the rectangular section end could create a pencil gas jet, with the thickness of the jet then preferably being less than or equal to the characteristic largest dimension of the grain.

So as to take into account the distance between the detection means and the evacuation means, the control system initiates the opening-closing cycles with a delay that is based on the distance to travel between these two points. For example, if the belt length between the focal position of the analyzing device on the belt (9) and the evacuation means (valve, air injection nozzle (12)) is 3 m and the travel speed on the belt is 3 m/s, a delay of one second is to be taken into account, optionally to correct, depending on the response time of the analyzing device (8), the control means (10) or the valve (12).

For the requirements of the invention and to be selective, the opening-closing cycle of the valve is to be fast and cohesive with the dwell time of the grains in front of the detector. Preferably, the opening-closing cycle time will not exceed 1 and 5 times the dwell time of the grain in front of the detection means, preferably less than 3 times this mean dwell time.

Thus, technologies of valves and actuators will be selected so as to have an opening-closing cycle of between 5 and 250 ms based on the travel speed of the transport means (5).

The gas jet (for example, air) created during this period has a speed that is at least equal to 5 times the terminal drop speed of the catalyst grain, preferably 10 times the terminal drop speed (in the case of a hydrotreatment extrudate, the terminal drop speed is in general close to 5 m/s and between 2 and 7 m/s).

When the actuator initiates the opening of the valve, the gas jet diverts the path of the grain to a receptacle (14) that harvests all of the grains in the contaminant whose content is greater than the sorting threshold defined by the operator.

If the actuator is not triggered, then the path of the grain exiting from the conveyor belt describes a normal parabola depending on the unrolling speed of the belt and the terminal drop speed of the particles. The grain then falls into a receptacle (13) that harvests all of the grains to be eliminated that do not contain the undesirable element. Thus, the grains collected at (13) will constitute a new batch that has, for example, an element content that is lower than the sorting threshold defined by the operator.

In relation to the prior art, the invention makes possible a rapid sorting depending on the desired element content of at least 20 to 100 objects (catalyst grains)/second, in general at least 50 and even 100 objects/second, or even beyond 100 objects/s, and its use allows up to 1,000 objects/second or more. The LIBS technique therefore allows itself alone a significant productivity.

Another advantage of the invention is to be able to be implemented in air or any other atmosphere (not interacting with the detection or the grains).

EXAMPLES

Example 1: Sorting of a Batch of a Mixture of NiMoPB and NiMoP Catalysts

Two catalysts of the NiMoPB and NiMoP types were mixed.

40 grains of a mixture were analyzed by LIBS to determine the presence or the absence of boron in these catalyst grains. An LIBS laboratory device (MobiLIBS III, IVEA) was used for this test and consists of a laser (Brio, Quantel, Nd-YAG at 532 nm) and a spectrometer (Mechelle Andor, 200-900 nm). A single laser shot was required, and each catalyst grain was analyzed under the following conditions: 12 mJ/spot of 140 μm/3-5 ns of pulse time. The doublet of the lines of B with a wavelength of 249.772 and 249.677 nm was used. A signal close to 2,000 hits on the line at 249.772 nm and a bit lower on the second line is observed in 43% of the grains being analyzed.

In the small quantity of material harvested during this sorting, 100 mg of each of the two categories formed by the sorting was mineralized under cold conditions for metering by ICP/OES (ICP Spectro Arcos). The mean boron content on the grains generating a signal of 2,000 hits on the line at 249.772 nm is 1,500 mg/kg whereas boron is not detected in the mineralizate formed by the grains having provided no boron signal. The sorting carried out on the basis of the detection of B on the doublet 249.772 and 249.677 nm is therefore effective for distinguishing the catalyst grains that may or may not contain boron.

Example 2: Mixture of NiMoP and Zeolitic Catalysts, Selection by Si

In the same way as the preceding example, 40 grains of two families of catalysts have been subjected to LIBS analysis. It is a matter of a catalyst with an NiMoP-type alumina substrate. The second catalyst is a zeolitic catalyst that essentially contains a ZSM5 zeolite and an aluminum binder, and it contains between 30 and 40% Si.

The LIBS system that is used is equipped with a laser (Centurion, 1064 nm, 100 Hz) and a spectrometer with high acquisition frequency (HR2000+, grating at 1,200 lines/mm, resolution of 0.18 nm for the 180-350 nm zone). The sorting was carried out on the basis of the presence or absence of the Si line at 280.308 nm, a signal of more than 20,000 hits being visible when the catalyst grain is a catalyst that contains zeolite.

The LIBS technique readily makes it possible to differentiate a batch of catalysts containing an NiMoP/alumina and zeolitic catalyst mixture.

The invention claimed is:

1. A method comprising separating at least one catalyst or adsorbent from a homogeneous mixture of catalysts and/or adsorbents, said catalysts or adsorbents having been used in a method for treatment of gas or hydrocarbon feedstock and containing as a constituent element a non-metal element that is P, B, Si, or Na, said method comprising
separating the catalyst grains or adsorbents according to a sorting threshold corresponding to a content of the constituent element that is sought and defined by a user,
running the catalyst grains of said mixture past a detection system consisting of LIBS detectors detecting a wavelength that is characteristic of said constituent element,
analyzing in an analyzing device associated with LIBS processes a signal sent by the detection system by comparing it to a set-point value that indicates a sorting threshold,
sending from the analyzing device a signal to order evacuation of grains according to the content thereof in said element, and obtaining at least 2 batches: at least one batch of catalysts loaded with said element above the sorting threshold and at least one batch of catalysts loaded with said element at or below the sorting threshold,
optionally regenerating at least one batch of catalyst that is loaded at or below the sorting threshold of said element,
and recycling at least one batch of catalyst that is loaded at or below the sorting threshold with said element into the gas or hydrocarbon batch treatment method.

2. The method according to claim 1, in which the sorting threshold is 0%.

3. The method according to claim 1, in which the hydrocarbon feedstock treatment method is hydrotreatment, hydrocracking, dehydrogenation, hydroconversion of distillates, hydrogenation, isomerization, or reforming, and the gas treatment is Claus method or tail gas treatments.

4. The method according to claim 1, in which the catalysts are spent hydrotreatment and/or hydrocracking catalysts, whose substrate comprises alumina or silica-alumina with the optional presence of zeolite.

5. The method according to claim 1, in which the catalysts come in a homogeneous form.

6. The method according to claim 5, wherein the catalysts are in the form of cylindrical extrudates, balls, trilobes, or multilobes.

7. The method according to claim 1, in which the number of grains detected/analyzed is at least 100 per second for a detection time of less than 10 ms.

8. The method according to claim 1, in which the spacing between the grains is less than or equal to the mean length of the grains.

9. The method according to claim 1, in which the sorting threshold for P is between 1 and 2% by weight of P.

10. The method according to claim 1, in which the sorting threshold for B is between 0.5 and 2% by weight of B.

11. The method according to claim 1, in which the sorting threshold for Si is between 1 and 3% by weight.

12. The method according to claim 1, in which the sorting threshold for Na is between 0.5 to 2% by weight.

13. A method comprising separating at least one catalyst or adsorbent from a homogeneous mixture of catalysts and/or adsorbents, said catalysts or adsorbents having been used in a method for treatment of gas or hydrocarbon feedstock and containing as a constituent element a non-metal element that is P, B, Si, or Na, said method consisting of
separating the catalyst grains or adsorbents according to a sorting threshold corresponding to a content of the constituent element that is sought and defined by a user,
running the catalyst grains of said mixture run past a detection system consisting of LIBS detectors detecting a wavelength that is characteristic of said constituent element,
analyzing in an analyzing device associated with LIBS processes a signal sent by the detection system by comparing it to a set-point value that indicates sorting threshold,
sending a signal from the analyzing device to order evacuation of grains according to the content thereof in said element, and obtaining at least 2 batches: at least one batch of catalysts loaded with said element above the sorting threshold and at least one batch of catalysts loaded with said element below the sorting threshold,
optionally regenerating at least one batch of catalyst that is loaded below the sorting threshold of said element, and recycling at least one batch of catalyst that is loaded with said element into the gas or hydrocarbon batch treatment method after optional regeneration.

* * * * *